United States Patent [19]

Tarcsafalvi

[11] Patent Number: 4,635,375
[45] Date of Patent: Jan. 13, 1987

[54] VERTICAL SHAFT SYSTEM FOR GYROSCOPIC THEODOLITES WITH TWO DEGREES OF FREEDOM

[75] Inventor: András Tarcsafalvi, Budapest, Hungary

[73] Assignee: Magyar Optikai Muvek, Budapest, Hungary

[21] Appl. No.: 528,850

[22] Filed: Sep. 2, 1983

[51] Int. Cl.[4] .............................................. G01C 19/00
[52] U.S. Cl. .................................. 33/318; 33/275 G; 33/281; 33/397
[58] Field of Search ................. 33/318, 275 R, 275 G, 33/281, 391, 397, 290

[56] References Cited

U.S. PATENT DOCUMENTS

| | | | |
|---|---|---|---|
| 2,000,524 | 5/1935 | Kothny, et al. | 33/318 |
| 2,852,943 | 9/1958 | Sedgfield | 33/318 |
| 3,162,951 | 12/1964 | Hintze, et al. | 33/275 G |
| 3,619,905 | 11/1971 | Stier | 33/275 G |

Primary Examiner—Willis Little
Attorney, Agent, or Firm—Handal & Morofsky

[57] ABSTRACT

A vertical shaft system for gyroscopic theodolites with two degrees of freedom for ensuring the vertical alignment of the azimuth determining pendulum system in the apparatus, wherein perforated stones are arranged in two axial points on the housing and on the azimuth determining pendulum system of the apparatus, and wires clamped on both ends are threaded through the perforated stones and tensioned by tensioning elements, furthermore perforated guiding stones are formed for alignment of the tensioned wires, and surfaces of rotation are formed in the vicinity of the axial points between the housing and azimuth determining pendulum system with an air gap about the wires.

2 Claims, 1 Drawing Figure

U.S. Patent     Jan. 13, 1987     4,635,375
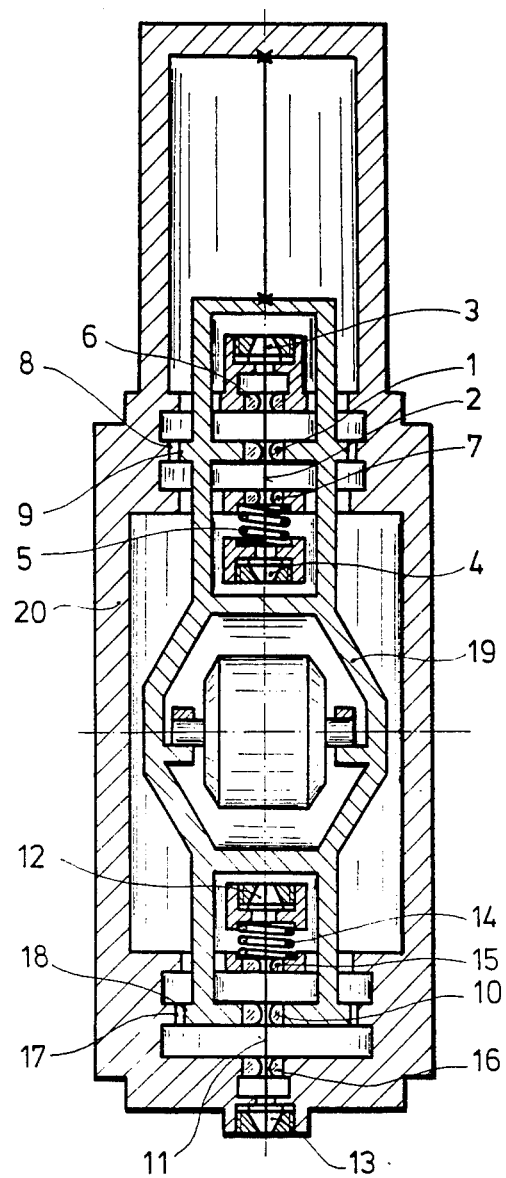

VERTICAL SHAFT SYSTEM FOR GYROSCOPIC THEODOLITES WITH TWO DEGREES OF FREEDOM

FIELD AND BACKGROUND OF THE INVENTION

This invention relates to a vertical shaft system ensuring the vertical alignment of the pendulum system of gyroscopic theodolites with two degrees of freedom for azimuth determination.

The bearing of the vertical shaft of the pendulum system of gyroscopic theodolites used for azimuth determination is selected as to obtain possibly a minimal moment of friction in relation to the directional torque of the gyroscope.

There are such frictionless shafts, where the azimuth determining pendulum system is suspended on a wire and in this case the shaft is formed by the torsion pendulum itself. Since the nearly horizontal axis of the gyroscope—partly depending on the latitude and partly owing to the rotation of the pendulum system around the vertical shaft—is compelled to move in the vertical plane too, thus this degree of freedom is restricted only partially by the above described pendulum system. In these systems the period of oscillation around the vertical shaft of the gyroscope with nearly horizontal axis is relatively long. The period of oscillation can be reduced by increasing the length of the pendulum, which is difficult for constructional reasons i.e. large dimensions, weight. In the case of given gyroscopes the period of oscillation will be the shortest when the pendulum system comprising the gyroscope has two degrees of freedom, i.e. the gyroscope is capable of turning only around its own axis and around the vertical shaft.

The known sliding-, ball-, gas-, magnetic-bearings may be used for supporting said vertical shaft. Since the maximum value of the so-called directional torque is only a few 100th Nm, in case of gyroscopes used for azimuth determination only such solutions may come into consideration, where the moment of friction is as low as possible.

The moment of friction of the miniature ball-bearings having a small friction coefficient is so high that they are suitable only for the shaft of the pendulum system of an instrument with low measuring accuracy. The disadvantage of the magnetic bearings is that owing to the unavoidable impurities present in the pendulum system, under the influence of the magnetic anomalies, directional torque will be produced.

Use of the gas-bearings is complicated and costly, because perfectly smooth bearing surfaces have to be formed, furthermore under varying bearing load the air gap has to be kept a constant value, consequently the gas supply is to be provided with automatic control system varying the pressure or the rate of feed.

SUMMARY OF THE INVENTION

The vertical shaft system according to the invention for gyroscopic theodolites with two degrees of freedom eliminates the disadvantages of above solutions.

According to the invention, perforated stones are arranged in two axial points on the housing and on the suspended pendulum system, in which wires clamped on both ends are arranged, tensioned by tensioning elements threaded through perforated stones and perforated guiding stones for alignment of the tensioned wires.

In an alternative aspect of the invention protection of the tensioned wires against breakage is provided for. A surface of rotation is formed in the vicinity of the axial points between the housing and pendulum system, between which an air gap is arranged as protection against breakage, the extent of which is fixed according to the length of the wire.

The shaft system is such as a sliding bearing, the essence of which is that the moment of friction is reduced by selecting the minimal shaft diameter. Since the very thin shafts, given by their strength parameters, will easily buckle in the traditional usage, therefore the bearing system with tensioned shaft according to the invention is necessary.

BRIEF DESCRIPTION OF THE DRAWING

The accompanied drawing shows further details of the invention.

FIG. 1. is a vertical cross-sectional view of the shaft system according to this invention.

DESCRIPTION OF THE PREFERRED EMBODIMENT

Perforated stone 1, wire 2, clamps 3,4, tensioning element 5, perforated guiding stones 6,7 and surfaces 8,9 are arranged in a system, forming one point of the vertical shaft of the pendulum system. Furthermore perforated stone 10, wire 11, clamps 12, 13, tensioning element 14, perforated guiding stones 15,16 and surfaces 17, 18 form the other point of the vertical shaft of the pendulum system.

In operation, the vertical shaft of the azimuth determining pendulum system 19 suspended on wire is embodied by two sustaining points. Theoretically, the formation of both sustaining points is the same. The pendulum part in the shaft arrangement is carried on bearings within the surrounding housing 20. In the arrangement shown in the diagram the upper sustaining point is embodied by perforated stone 1 rigidly fixed to the pendulum part and by the tensioned wire 2 fixed to housing 20. From a functional point of view such an arrangement is equivalent, where the perforated stone is in the housing and the tensioned wire is in the pendulum part 19. One end of the tensioned wire 2 is rigidly fixed in clamp 3 to the housing 20, while the other one fixed in clamp 4 is axially tensioned with tensioning element 5. The perforated guiding stones 6,7 rigidly fixed in the housing 20 are used for alignment of the tensioned wire. Size of the air gap between surface 9 of the pendulum part and surface 8 of housing 20 is selected as to avoid breakage of the tensioned wire upon contact of the surfaces when exposed to abnormal external stress. Operation of the elements embodying the other /lower/ sustaining point of the shaft is the same as those elements embodying the upper sustaining point.

The vertical shaft system of the pendulum system enables the pendulum system to move to a limited extent in the direction of the vertical shaft in relation to the housing, in order to meet the other structural requirements without any change in the quality of the bearing.

What we claim is:

1. A vertical shaft system for gyroscopic theodolites with two degrees of freedom, comprising housing, a bearing, a suspended pendulum system carried on said bearing and arranged in said housing for azimuth determination, perforated stones (1,10) arranged in two axial points on the housing, said suspended pendulum system comprising wires (2,11) clamped on both ends, tensioning elements (5,14) threaded through said perforated stones for tensioning said wires, and perforated guiding stones (6,7 and 15,16) for aligning the tensioned wires.

2. Apparatus as claimed in claim 1, comprising surfaces of rotation (8,9 and 17,18) for protecting the tensioned wires (2,11) against breakage, said surfaces of rotation (8,9 and 17,18) are formed in the vicinity of the axial points between the housing and said pendulum system, an air gap arranged between said housing and said pendulum system for protection against breakge, the extent of said air gap being fixed according to the length of the wire.

* * * * *